April 8, 1952

H. A. TOULMIN, JR 2,592,081

METHOD OF MAKING CONTAINERS

Filed March 26, 1949

INVENTOR
HARRY A. TOULMIN, JR.
BY
Toulmin & Toulmin
ATTORNEYS

Patented Apr. 8, 1952

2,592,081

UNITED STATES PATENT OFFICE 2,592,081

METHOD OF MAKING CONTAINERS

Harry A. Toulmin, Jr., Dayton, Ohio, assignor to The Commonwealth Engineering Company of Ohio, Dayton, Ohio, a corporation of Ohio Application March 26, 1949, Serial No. 83,712

4 Claims. (Cl. 93—35)

This invention deals with a laminated material suitable for making containers, and in particular bags, with the process of making such materials and containers, and with the containers themselves.

It is an object of this invention to provide laminated materials and articles which have cushioning properties.

It is an object of this invention to provide laminated materials and articles which are highly tear-resistant.

It is an object of this invention to provide laminated materials and articles which are heat-insulating.

It is still another object of this invention to provide laminated materials and articles which are moisture-proof.

It is still another object of this invention to provide laminated materials and articles which have a high absorptive capacity for moisture.

It is still another object of this invention to provide laminated materials and articles which are flame-resistant.

A further object of this invention is a method of making sponge rubber—containing, laminated material in which a gas-impregnated rubber latex, released and deposited on a base material, is vulcanized thereon without injuring said base material.

It is also an object of this invention to provide containers from laminated materials which may be hermetically closed by heat-sealing.

These and other objects are accomplished mainly by applying a layer of rubber latex foam to a base sheet and curing said foam whereby it is integrally united with said base sheet.

The process of my invention is particularly well applicable for a sponge rubber that has been prepared by thoroughly impregnating aqueous rubber latex with nitrous oxide gas or air and depositing said mixture onto the sheet material whereby the gas expands and creates a foam. Curing of said foam on said base sheet then yields a laminated or anchored product which has the excellent characteristics enumerated above. Details of the process and apparatus for making sponge rubber are given in the copending applications:

Lewis Serial No. 10,137, filed February 21, 1948, now Patent No. 2,567,949; Lewis Serial No. 13,605, filed March 8, 1948, now abandoned; Lewis Serial No. 19,568, filed April 7, 1948, now Patent No. 2,567,951; and Lewis Serial No. 28,490, filed May 21, 1948, now Patent No. 2,567,952.

All kinds of natural and synthetic rubber latices are suitable for the process of my invention. Furthermore, all the auxiliary materials conventional and known in the rubber industry, such as vulcanizing agents, coagulants, sensitizers, foaming agents, decelerators, stabilizers and antioxidants may be added to the latex. It is also advantageous to incorporate silicate and other materials into the latex whereby a more stable foam is obtained and the sponge rubber is made flame-resistant.

As the base sheet, a great number of materials are usable, such as paper, fabric, cellophane, metal foil, and sheets made of synthetic plastics.

The process of my invention may be used for preparing laminated material in a continuous as well as in a discontinuous process. However, it may also be advantageously used for directly manufacturing rubber sponge-lined containers, for instance sponge-lined paper bags or laminated containers.

The bags may be lined after formation or made from previously laminated stock.

The invention will be more clearly understood from the following description taken in connection with the accompanying drawings which are given for the purpose of illustration only and not for that of limitation.

Figure 1:
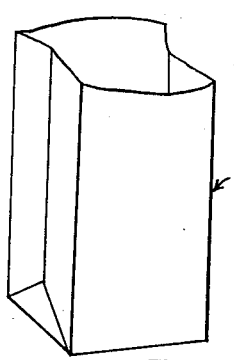
Figure 1 is a fragmentary elevational diagrammatic view of a paper bag.
Figure 2:
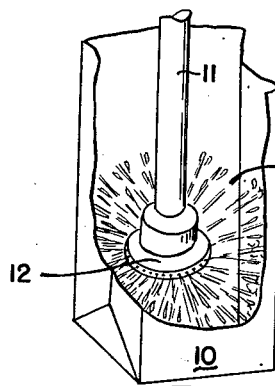
Figure 2 is a fragmentary elevational diagrammatic view of the same paper bag but during a later step of the process.
Figure 3:
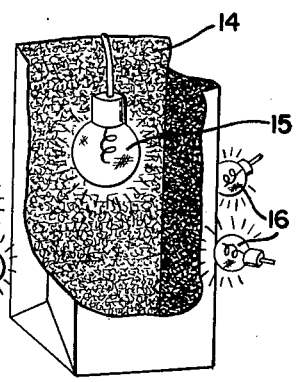
Figure 3 is a fragmentary elevational diagrammatic view of said bag in a still further step of the process of my invention.

Referring to the drawings in detail, and in particular to Figures 1 to 3, the reference numeral 10 designates a paper bag. A supply pipe 11 which is connected with a latex tank (not shown) is provided with a nozzle 12. Said nozzle is inserted into said bag 10 and sprays a latex-gas mixture 13 on the inside surfaces of said container 10. A lining 14 of rubber foam is thus deposited. A plurality of curing lamps 15 and 16 are then arranged inside and outside said container for curing and integrally bonding said rubber foam as a sponge rubber to said container.

Figure 4:
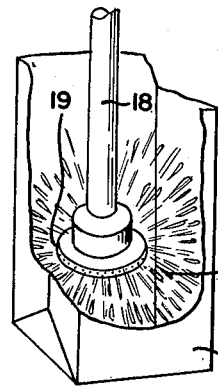
Figure 4 is a fragmetnary elevational diagrammatic view of another container during processing by a modified process of my invention.
Figure 5:
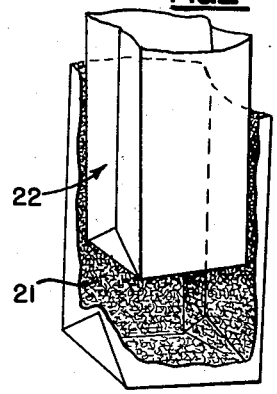
Figure 5 is a fragmentary elevational diagrammatic view of said container in a further step of said modified process.
Figure 6:
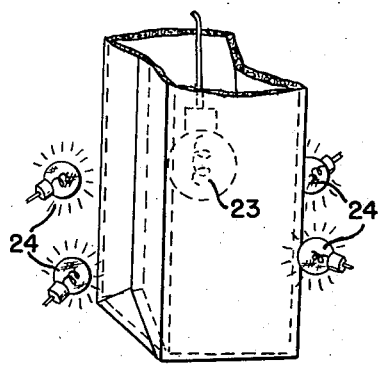
Figure 6 is an elevational fragmentary diagrammatic view illustrating the final step of said modified embodiment of my invention.

Figures 4 to 6 illustrates a modification of my process in which a second paper bag is superposed on said sponge rubber layer. In these drawings the outside bag is designated with the numeral 17, the latex supply pipe with 18, and the nozzle with 19. A latex gas mixture 20 is deposited on said container 17 as an intermediate foam layer 21 whereupon an inner lining 22 is inserted. The entire assembly is then again cured by means of an inside lamp 23 and a plurality of outside lamps 24. The article obtained by this modification of my process is also a well-bonded container in which the individual layers are inseparably united.

It is obvious that the vulcanization temperatures have to be maintained within certain limits in order to avoid decomposition or injury of the base sheets. Thus, for instance, in the examples just described in connection with Figures 1, to 6, the vulcanization temperature has to be kept below 250° F. in order to avoid scorching of the paper.

Figure 7:
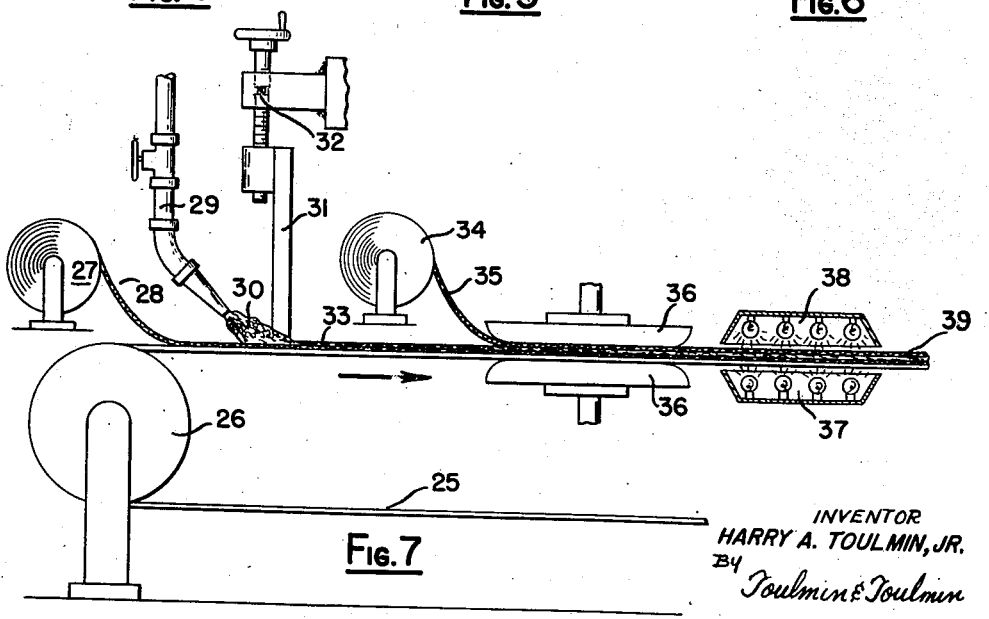
Figure 7 is an elevational diagrammatic view of an apparatus for carrying out the process of my invention in a continuous operation.

Figure 7 which illustrates a modification for continuous operation of my process shows an endless belt 25 driven in the direction of the arrow by drive rolls 26. A reel 27 dispenses a continuous sheet 28 onto said belt. A dispense pipe 29 supplies a latex-gas mixture 30 and deposits it on said sheet 28. Adjacent said dispense pipe, a doctor blade 31 is arranged the distance of which from said belt is adjustable by means of a screw 32. Said doctor blade provides for spreading of said latex foam and for control and equalization of the thickness; a layer of rubber foam 33 is thus obtained. A second reel 34 supplies another continuous sheet and deposits it on top of said foam layer. Two guide plates 36 exert a slight pressure on the assembled layers and thus maintain the uniform thickness. Finally, two sets of infra-red lamps 37 and 38, respectively effect curing of said rubber foam into a sponge rubber and lamination of the three layers into one integral sheet 39.

The materials and articles obtained by the process of my invention are characterized by their being highly tear-resistant and consequently by a long service life. In the case of making containers, it is not necessary to paste the seams of the outside layer, for instance the seams of a paper bag, since the sponge rubber during the curing step seals the seams satisfactorily. Likewise, the containers after being filled may be hermetically closed by heat sealing which is especially advantageous if these containers are to be used for packaging of perishable materials. Since sponge rubber, if prepared from silicate-containing latices, is highly flame-resistant, containers made from the materials of my invention are not completely destroyed in the case of a fire which also is of great advantage.

The sponge rubber also gives excellent cushioning effect to the containers so that they are especially well qualified for packaging breakable materials such as eggs. Moreover, the laminated material has a high heat-insulating effect so that it lends itself excellently for packaging and shipping low-melting materials, for instance for candies, butter, and the like. One of the many uses which is based on the heat-insulating property of my material is for the manufacture of food containers for picnics.

Other outstanding properties of the material of my invention are its moisture proofness and also its moisture absorbability. These features may be utilized for packing hygroscopic substances and liquid-containing material; for instance, the material of this invention has been found advantageous for packing berries, because the sponge rubber absorbs the juice separating from the berries and thus leaves the outside of the container dry and clean.

The sponge rubber lining may also be impregnated with various materials, for example it may be impregnated with a disinfectant so that the content is rendered and maintained sterile. Likewise, the sponge rubber may be utilized as a carrier for moth-proofing or insecticidal materials. It will thus be seen that the number of uses of the material of my invention are unlimited.

It will be understood that while there have been described herein certain embodiments of my invention, it is not intended thereby to have this invention limited to the specific details given in view of the fact that it is susceptible to various modifications and changes which come within the spirit of the disclosure and the scope of the appended claims.

I claim:

1. In a method of making a bag, the steps of forming a flexible sheet material into a bag of the desired shape; spraying a rubber latex-gas mixture onto the inner walls of said preformed bag whereby a layer of rubber foam is formed on said walls; placing an inner lining of flexible sheet material onto said foam layer to form a double wall bag; and applying heat to both the inner and outer walls of said bag assembly whereby said rubber foam is cured into a sponge material and the inner and outer sheet layers are integrally united with said sponge.

2. In a method of making a bag, the steps of forming a flexible sheet material into a bag of the desired shape; spraying a rubber latex-gas mixture onto the inner walls of said preformed bag whereby a layer of rubber foam is formed on said walls; placing an inner lining of flexible sheet material onto said foam layer to form a double wall bag; and applying radiant heat to the outside and the inside of said assembly whereby said rubber foam is cured into a sponge material and the inner and outer sheet layers are integrally united with said sponge.

3. In the method of making a bag, the steps of forming a flexible sheet material into inner and outer bags of the desired shape, so when the bags are assembled there will be a space between the outer wall of the inner bag and the inner wall of the outer bag, applying a layer of rubber foam comprising a rubber latex-gas mixture on one of the outer walls of the inner bag and the inner wall of the outer bag, placing the bags together to form a double wall bag, and applying heat to both the inner and outer walls of the bag assembly, whereby the said rubber foam is cured into a sponge material and the inner and outer bags are integrally united with the said sponge material.

4. In the method of making a bag, the steps of arranging a pair of bag elements of flexible sheet material of the desired shape in spaced relation so that a space of substantially uniform thickness is between the bag elements, filling the said space with rubber foam comprising a rubber latex-gas mixture, and applying heat to the outside and the inside of the bag assembly, whereby the rubber foam is cured into a sponge material and the inner and outer walls of the bag assembly are integrally united with said sponge material.

HARRY A. TOULMIN, Jr.

REFERENCES CITED

The following references are of record in the file of this patent:

UNITED STATES PATENTS

| Number | Name | Date |
|---|---|---|
| 1,352,739 | Egerton | Sept. 14, 1926 |
| 1,712,965 | Maranville | May 14, 1929 |
| 1,845,688 | Untiedt | Feb. 16, 1932 |
| 1,924,635 | Buffington | Aug. 27, 1933 |
| 1,935,380 | Smithwick | Nov. 14, 1933 |
| 2,055,030 | Hoppe | Sept. 22, 1936 |
| 2,116,984 | Seddon | May 10, 1938 |
| 2,161,308 | Murphy et al. | June 6, 1939 |
| 2,179,864 | Scott | Nov. 14, 1939 |
| 2,184,166 | Rape | Dec. 19, 1939 |
| 2,216,830 | Roberts | Oct. 8, 1940 |
| 2,230,998 | Coakley et al. | Feb. 11, 1941 |
| 2,271,058 | Bruns | Jan. 27, 1942 |
| 2,288,190 | Harrison | June 30, 1942 |
| 2,321,111 | Stamberger | June 8, 1943 |
| 2,364,009 | Tessendorf et al. | Nov. 28, 1944 |
| 2,380,903 | Ray | July 31, 1945 |
| 2,427,647 | Vahlteich | Sept. 16, 1947 |
| 2,438,624 | Stenglein | Mar. 30, 1948 |

FOREIGN PATENTS

| Number | Country | Date |
|---|---|---|
| 463,160 | Great Britain | Mar. 23, 1937 |
| 574,131 | Great Britain | Dec. 21, 1945 |